US008260755B2

(12) United States Patent
Stecker (10) Patent No.: US 8,260,755 B2
(45) Date of Patent: Sep. 4, 2012

(54) PROCESS-BASED DOCUMENTATION METHOD AND SYSTEM

(75) Inventor: Gary F. Stecker, Riverview, FL (US)

(73) Assignee: International Business Machines Corporation, Armonk, NY (US)

( * ) Notice: Subject to any disclaimer, the term of this patent is extended or adjusted under 35 U.S.C. 154(b) by 1411 days.

(21) Appl. No.: 10/918,520

(22) Filed: Aug. 12, 2004

(65) Prior Publication Data

US 2006/0064334 A1 Mar. 23, 2006

(51) Int. Cl.
*G06F 17/30* (2006.01)

(52) U.S. Cl. ........................................... 707/694

(58) Field of Classification Search .................. 707/100, 707/694
See application file for complete search history.

(56) References Cited

U.S. PATENT DOCUMENTS

| | | | | |
|---|---|---|---|---|
| 5,630,069 | A | 5/1997 | Flores et al. | 395/207 |
| 5,999,911 | A | 12/1999 | Berg et al. | 705/9 |
| 6,002,396 | A | 12/1999 | Davies | 345/339 |
| 6,505,219 | B1 | 1/2003 | MacLean et al. | 707/530 |
| 6,553,369 | B1 | 4/2003 | Guay et al. | 707/3 |
| 7,117,449 | B1 * | 10/2006 | Levin et al. | 715/765 |
| 2002/0120480 | A1 | 8/2002 | Kroeger | 705/7 |
| 2003/0041314 | A1 * | 2/2003 | Heeren et al. | 717/109 |
| 2003/0055695 | A1 | 3/2003 | Mori et al. | 705/7 |
| 2003/0078820 | A1 | 4/2003 | Ouchi | 705/7 |
| 2003/0231200 | A1 | 12/2003 | Zemore et al. | 345/709 |
| 2004/0078373 | A1 * | 4/2004 | Ghoneimy et al. | 707/10 |
| 2004/0117759 | A1 * | 6/2004 | Rippert et al. | 717/100 |
| 2004/0225549 | A1 * | 11/2004 | Parker et al. | 705/8 |

FOREIGN PATENT DOCUMENTS

WO    WO 00/14618    *    8/1999

OTHER PUBLICATIONS

Visio Corporation, "Creating Business Diagrams with Visio", Dec. 1995, Visio, Version 4, p. iii-vi, 2-4, 22-26, 43, 103-111,116, 194, 198, 211, 218.*
Walker et al., "Microsoft Office Visio 2003 Inside Out", Oct. 29, 2003, Microsoft Press, Selected Chapters.*
Visio, Visio 2000 Standard Edition User's Guide, Dec. 1999, p. 27-64.*
Joiner et al., "Flowcharts: Plain & Simple, Learning and Application Guide: Everything you need to know about flowcharts but are too busy to ask", Dec. 1995, P. cover, Oriel inc. Publication, P. cover, TOC, 7-9, 96-98.*

* cited by examiner

*Primary Examiner* — Khanh Pham
(74) *Attorney, Agent, or Firm* — William E. Schiesser, Esq.; Blanche E. Schiller, Esq.; Heslin Rothenberg Farley & Mesiti P.C.

(57) ABSTRACT

A process-based method and system for mapping and documenting a business process integrates information from a plurality of sources into a process map in such manner that only those sources needed to perform the task at hand are accessed in turn through steps in the process map. Business rules pertaining to the task at hand are built into the process steps. The method involves developing a process map, including a series of flow charts, that integrates all processes, sub processes, procedures, reference materials, and forms into a common repository. Advantageously, the method guides the user in step-by-step fashion as to how to use any attached information and tools to successfully complete the process, accessing sub levels of procedure level flow as needed, without requiring access to any other information, tools, or processes.

20 Claims, 7 Drawing Sheets fig. 1 fig. 2 fig. 3 fig. 4 fig. 5A fig. 5B fig. 6

PROCESS-BASED DOCUMENTATION METHOD AND SYSTEM

TECHNICAL FIELD

This invention relates in general to a method and system for documenting a process and, more particularly, to providing a self-contained method and system for providing a process map and documenting a business process.

BACKGROUND OF THE INVENTION

Process mapping and documentation continue to be key issues in business, particularly with respect to software and business processes. Typically, this requires an inordinate amount of cross-referencing to external materials, including searching through a lot of extraneous materials not relevant to the particular task at hand. Disadvantageously, any documentation created as a result thereof includes such extraneous materials that cannot be eliminated because it may be needed for the next task. And hence, training in such processes is often a daunting endeavor, consuming a lot of time and effort, not to mention cost.

Accordingly, it is desirable to provide a process-based documentation method and system in such a way as to be universally applicable to software and business processes. It is further desirable that such method and system be applicable to desk level procedures. Moreover, it is desirable that such method and system be self-contained, i.e., such that it provides its own training and usage documentation.

SUMMARY OF THE INVENTION

The shortcomings of the prior art are overcome and additional advantages are provided through a process-based method and system for mapping and documenting a process. The present invention advantageously integrates information from a plurality of sources into a process map, comprising flow diagrams, in such manner that only those sources needed to perform the task at hand are accessed in turn through steps in the process map. Such sources may include, for example, forms, support documentation, tools, and internal and/or external web links, and any other sources needed to support the process. Business rules pertaining to the task at hand are likewise built into the process steps. The method comprises developing a process map, comprising a series of flow charts, which integrates all processes, sub processes, procedures, reference materials, and forms into a common repository. Advantageously, the method guides the user in step-by-step fashion as to how to use any attached information and tools to successfully complete the process, accessing sub levels of procedure level flow as needed, without requiring access to any other information, tools, or processes external thereto.

Systems and computer program products corresponding to the above-summarized methods are also described and claimed herein.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Presented herein is a technique for providing a process map and documenting a business process. In particular, the present invention provides a self-contained, process-based method and system for documenting process development and usage. The process-based method and system integrate all processes, sub processes, procedures, reference materials, and forms into a common repository that provides all steps for successfully executing a process to deliver desired results, without requiring access to any other information, tools, or processes external thereto.

As used herein, the following definitions are provided. A process comprises process steps that describe what needs to be accomplished to attain an objective. A sub process comprises a sub element of an overall process. A procedure is information arranged in such a manner as to describe how to attain an objective, or the lowest form of a process. Process flow is a graphical representation of a process. Procedure flow, or work flow, is a graphical representation of a procedure.

The initial step in the process-based documentation method in accordance with an aspect of the invention is to identify the highest level process that needs to be satisfied in order to achieve the business objective. The next step is to define the sub processes.

Figure 1:
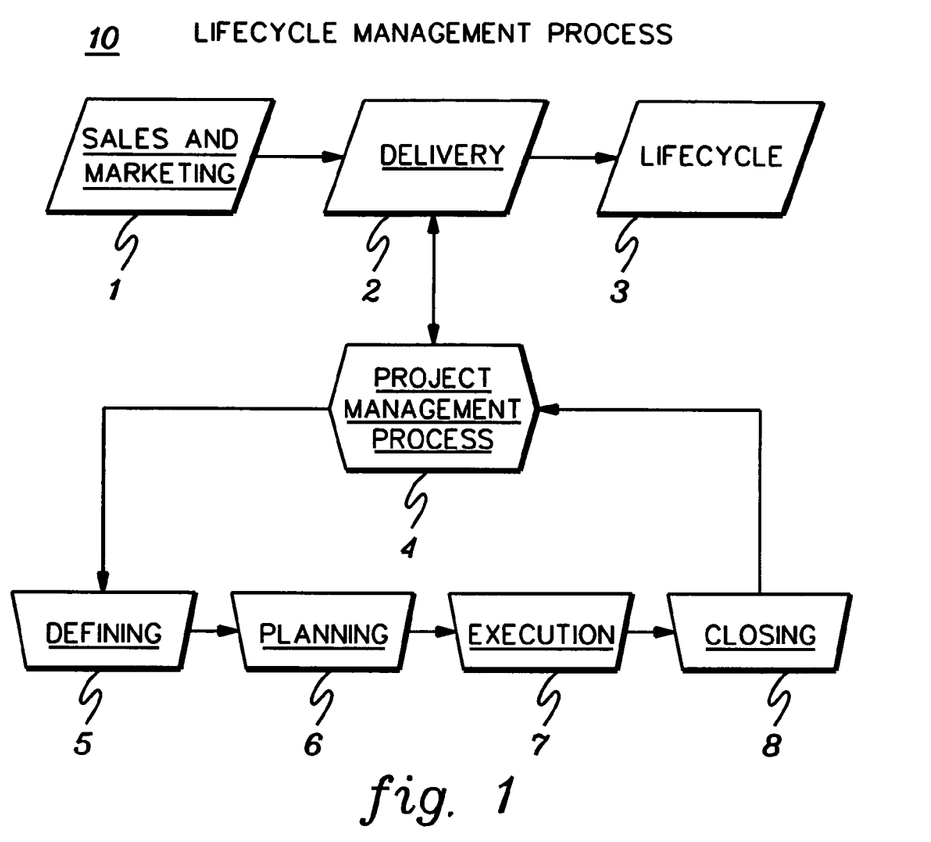
FIG. 1 illustrates exemplary high-level business process mapping and documentation in accordance with an aspect of the present invention.
Figure 2:
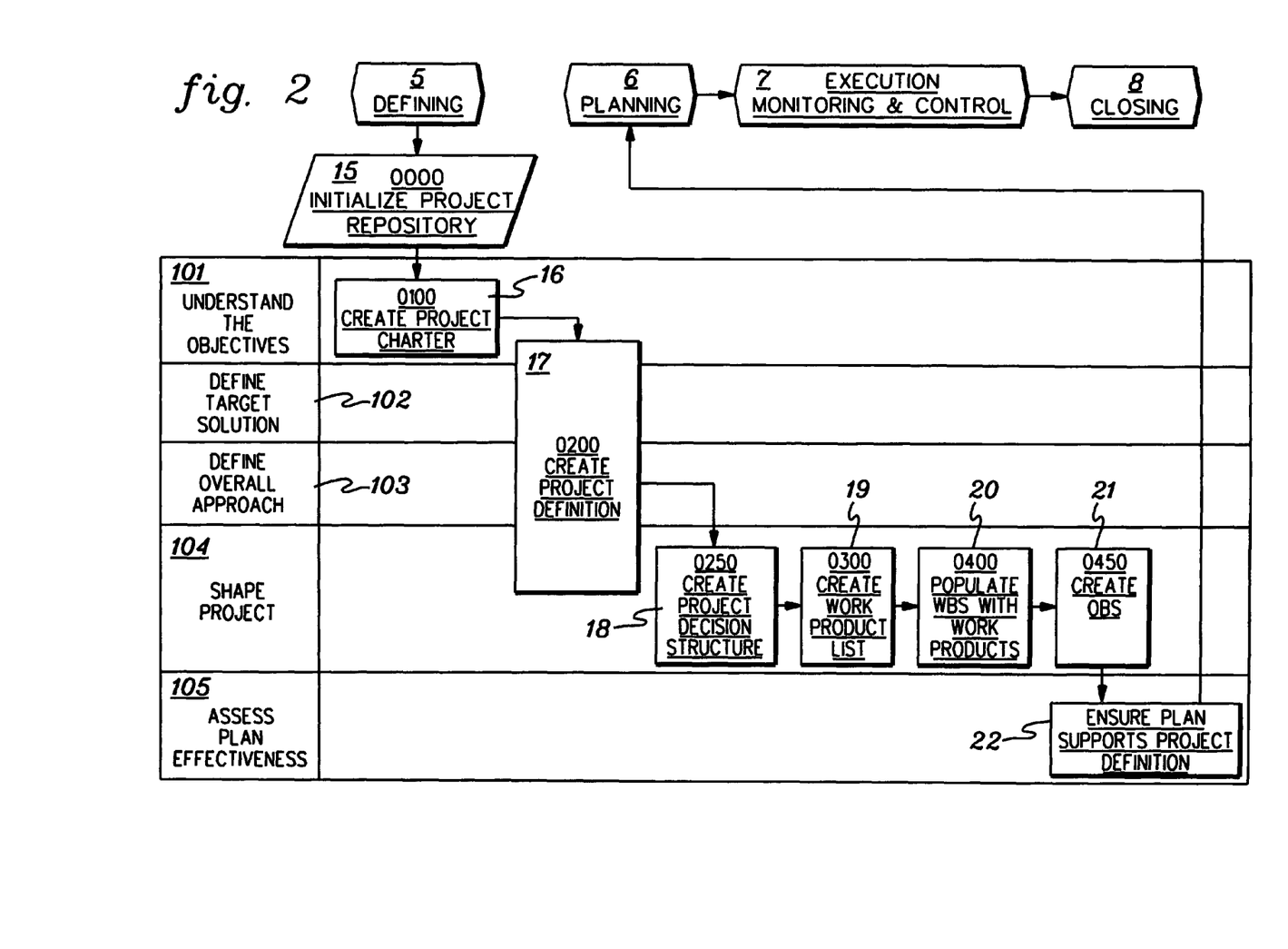
FIG. 2 illustrates exemplary mapping and documentation of a sub process in accordance with an aspect of the present invention.

FIG. 1 represents an exemplary high-level business process, e.g., a product lifecycle management process 10. The highest levels of the process are represented across the top of the chart: Sales and Marketing (block 1); Delivery (block 2); and Lifecycle (block 3). By way of example, under Delivery (block 2), there is another high-level process, i.e., the Project Management Process (block 4), to which all Delivery sub processes are to conform. The Project Management Process, block 4, comprises the overall set of business rules that are applied in the process of FIG. 1. One of the business rules in the PMP is that projects will have four sub processes, as represented by shaped blocks 5-8; i.e., Defining (block 5), Planning (block 6), Execution (block 7), and Closing (block 8). The work products that are to be produced in each sub process, as defined by the business process, are shown in FIG. 2, blocks 16-22.

To support the process-based method and system described herein, a suitable tool for diagramming flow charts is preferably used. Such a tool preferably allows linkage to other sources, such as forms and web sites. An example of a suitable tool is Visio® software, sold by Microsoft Corporation. Another suitable tool is allClear® software, sold by Proquis Ltd. These are just examples; any other suitable tool may be employed.

In the exemplary process of FIG. 1, underlined steps have additional levels comprising one or more sub processes or procedures. In one embodiment, these are accessed by clicking on the underlined step. For example, FIG. 2 illustrates the level expansion that occurs when clicking on Defining (block 5). As shown, under Defining (block 5), the sub process Initialize Project Repository (block 15) is accessed. Under block 15, all the processes needed to carry out the initialization of the project repository are provided. In FIG. 2, an exemplary "swim lane" style is provided to represent the processes, wherein each "swim lane" provides the processes need to accomplish the goals listed at the left of the drawing. The goals for the Defining process are listed as follows: Understand the Objectives (block 101); Define Target Solution (block 102); Describe Overall Approach (block 103); Shape Project (block 104); Assess Plan Effectiveness (block 105). The invention herein is not limited to such a swim-lane representation of goals and processes, but is provided by way of example only.

In the "swim lane" of block 101, i.e., "Understand the Objectives", there is one sub process, as represented by block 16, i.e., Create Project Charter. Then, overlapping the goals of blocks 101-103, the sub process is Create Project Definition. Proceeding in accordance with the illustrated process flow, "swim lane", or objective 105 ("Shape Project") includes block 18 ("Create Project Decision Structure"), block 19 ("Create Project Work List"), block 20 ("Populate WBS (Work Breakdown Structure) with Work Products"), block 21 ("Create OBS (Organization Breakdown Structure)"). In accordance with the present invention, these process steps are exemplary only; this example is provided only by way of example to show how each step of the process flows in accordance with the method of the present invention to allow the user to use the process to produce the desired work product and documentation, without requiring materials additional to that which is set forth specifically in the process.

Figure 3:
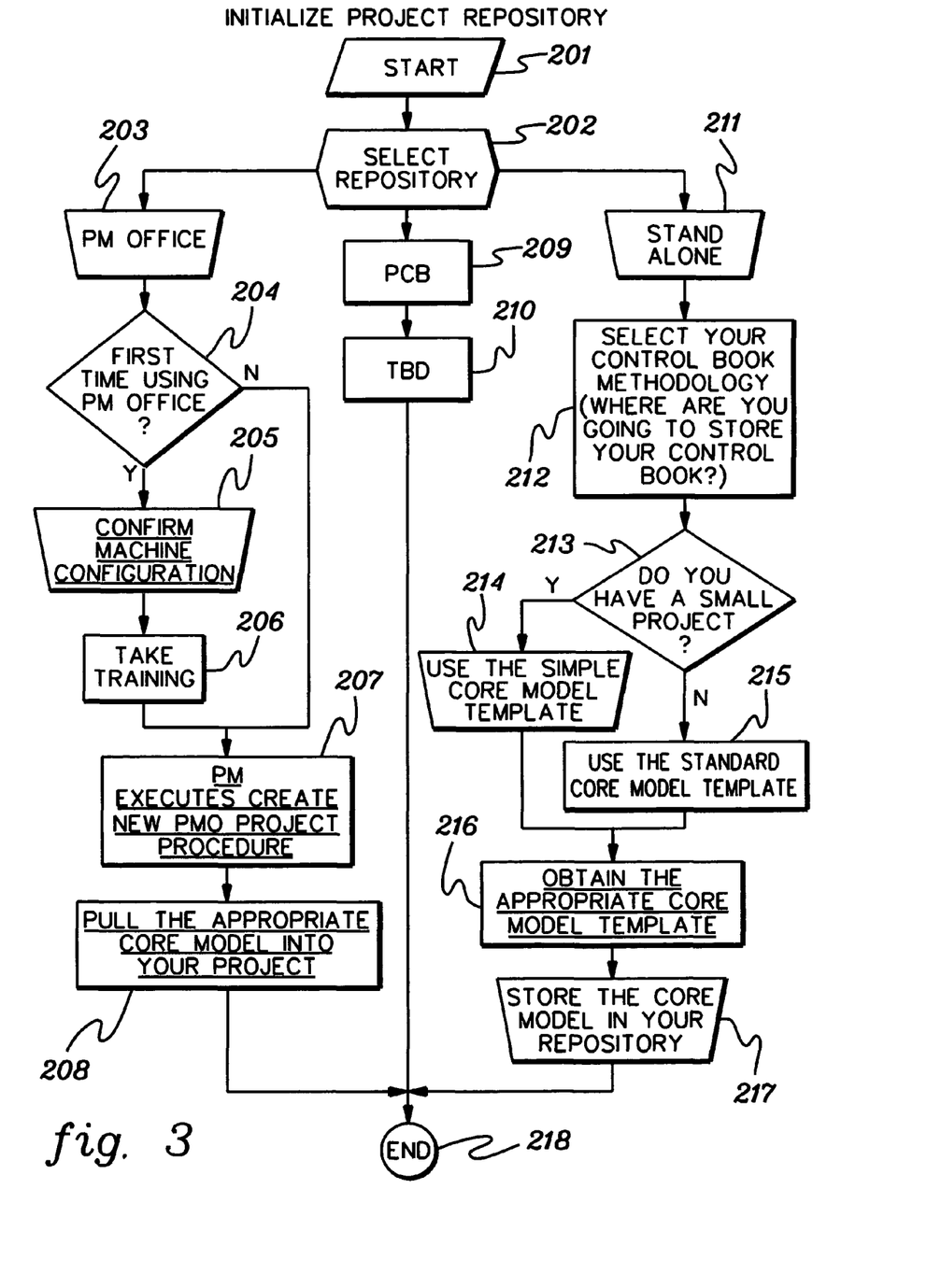
FIG. 3 illustrates an exemplary flow diagram for processes and sub processes, and business goals, in accordance with an aspect of the present invention.

A user "drills down" farther (i.e., accesses sub levels in a process) by clicking on a particular process. In particular, for example, in accordance with an exemplary business rule, by clicking on the Initialize Project Repository block 15, the user accesses all the steps needed to perform that process, as illustrated by the flowchart of FIG. 3. After Start (step 201) of the initialization of the process, the repository for the overall process is selected (step 202). In this particular example, three different types of repositories are provided: the PMOffice™ tool sold through the partnership of IBM® and Systemcorp® (step 203); PCB, as described hereinbelow, (step 209); and a stand-alone repository (step 211). Although three possible repositories are illustrated, this is by way of example only; any number of suitable repositories may be accommodated by the present invention. Advantageously, the present invention allows for availability and documentation of any number of repository paths.

In the PMOffice™ path, step 204 queries the user as to whether this is the user's first time using PMOffice™. If the answer is yes, then the user is taken through the steps of confirming machine configuration (step 205) and training (step 206). After step 206 (or if the answer to the query in step 204 is no), then the user, at step 207, is instructed to create a new PMOffice™ Project. If the user does not know how to do this, then there is available an underlying detailed procedure under block 207 (e.g., by clicking thereon). Then, at step 208, the user is instructed to pull in the appropriate Core Model. Similarly, if the user does not know how to complete that step, then there is an underlying detailed procedure attached to block 208. As used herein, the term Core Model is defined by PMOffice™ and refers to a standard set of templates and processes for use in every project. The set comprises simple and standard templates. Depending on the size and complexity of a project, the user selects which one to use based on a set of business rules.

The PCB (Project Control Book) path, represented generally as including blocks 209 (PCB) and 210 (TBD, i.e., to be determined), represents any other suitable repository for storing documents related to projects. PCB is representative as an exemplary type repository, specifically a Lotus Notes database application, sold through Lotus Corporation.

The stand-alone repository path, beginning at block 211, represents a repository that does not require links to other external tools, such as PMOffice™. Under the stand-alone repository block 211, the first step (212) is to select your control book methodology; i.e., to determine where the control book is going to be stored (the selection of the project repository and where it will be housed). Block 213 asks whether the project is small. To determine how "small" is defined, the user clicks on block 213 and is presented with, for example, a checklist of criteria for determining whether the project is "small". If yes, a simple core model template is provided by block 214. If not, the standard core model template is provided in step 215. Then, in step 216, the user obtains the appropriate core model template; and step 217 provides for storing the core model in the selected repository. Step 218 ends the process.

Figure 4:
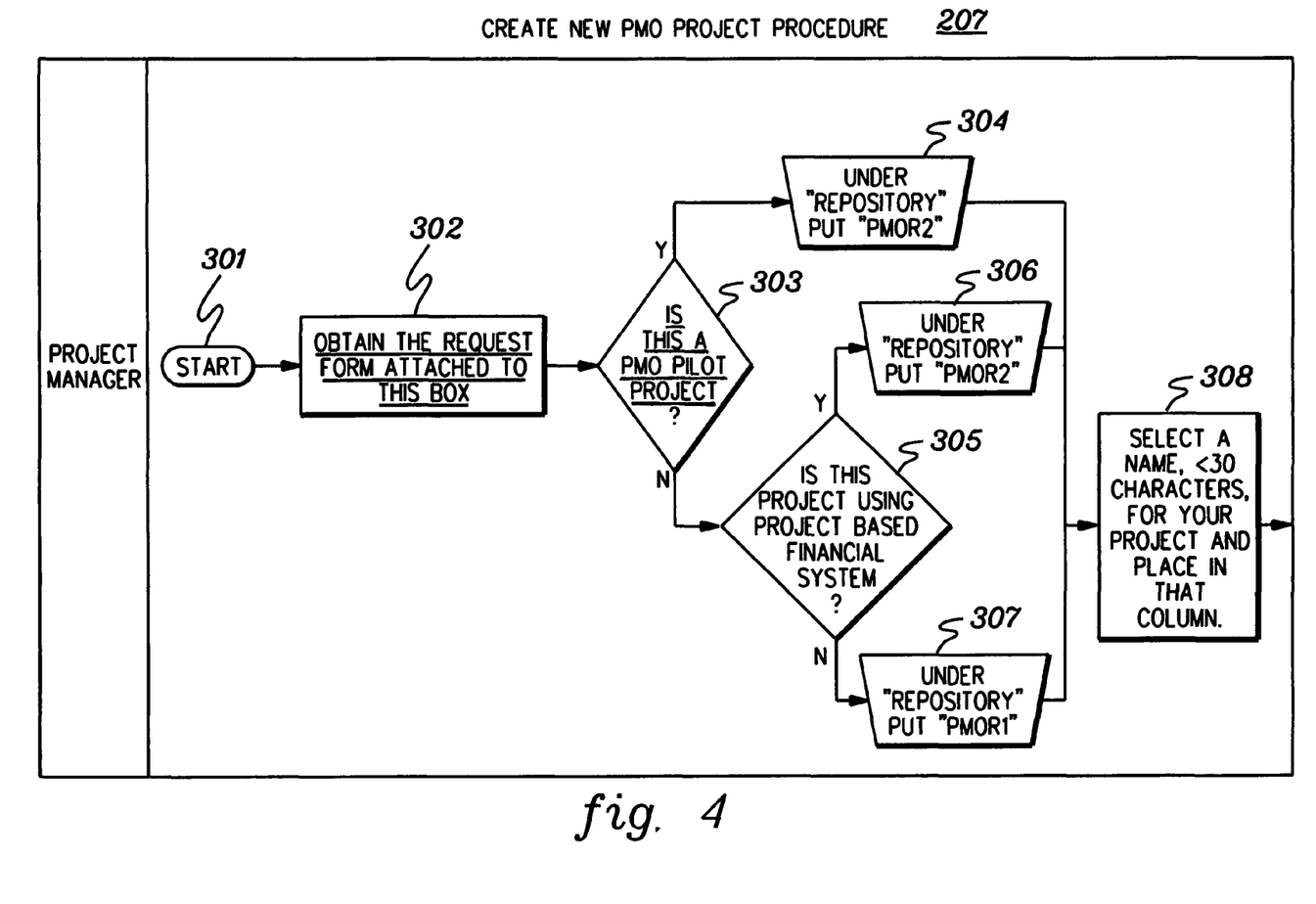
FIG. 4 illustrates an exemplary flow diagram for a sub process in accordance with an aspect of the present invention.

In accordance with another aspect of the present invention, after the processes and sub processes are defined, any reference material, information, or forms needed to complete the process are linked to the system. For example, as illustrated in FIG. 4, under the sub process entitled "Create New PMO Project Procedure" (see step 207 of FIG. 3), step 301 starts the process, and step 302 provides for obtaining a request form required by the process. By clicking on step 302, the form is directly accessed. Steps 303-308 provide step-by-step instructions for filling out the form. For example, as illustrated, Step 303 queries the user as to whether this is a pilot project, and, if so, directs the user through steps 304 and 308; if not, the user is directed to an additional inquiry in step 305 (e.g., whether the project is using project-based financial system), and then through additional instructions 306 or 307, before step 308. Again, no reference to other external materials is required. The form is directly accessed, and then step-by-step instructions are provided.

Figure 5A:
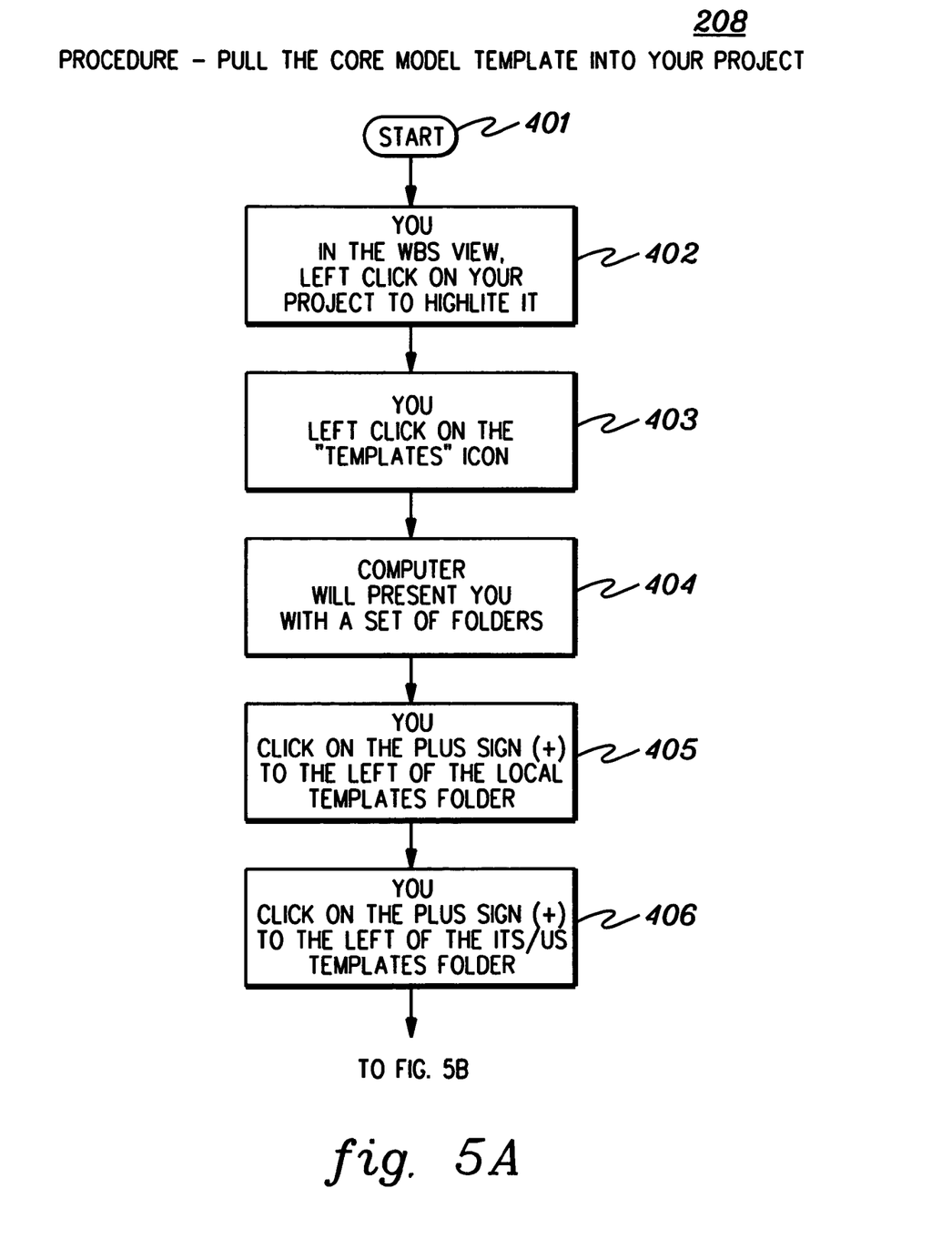
FIGS. 5A and 5B illustrate an exemplary flow diagram for a procedure in accordance with an aspect of the present invention.
Figure 5B:
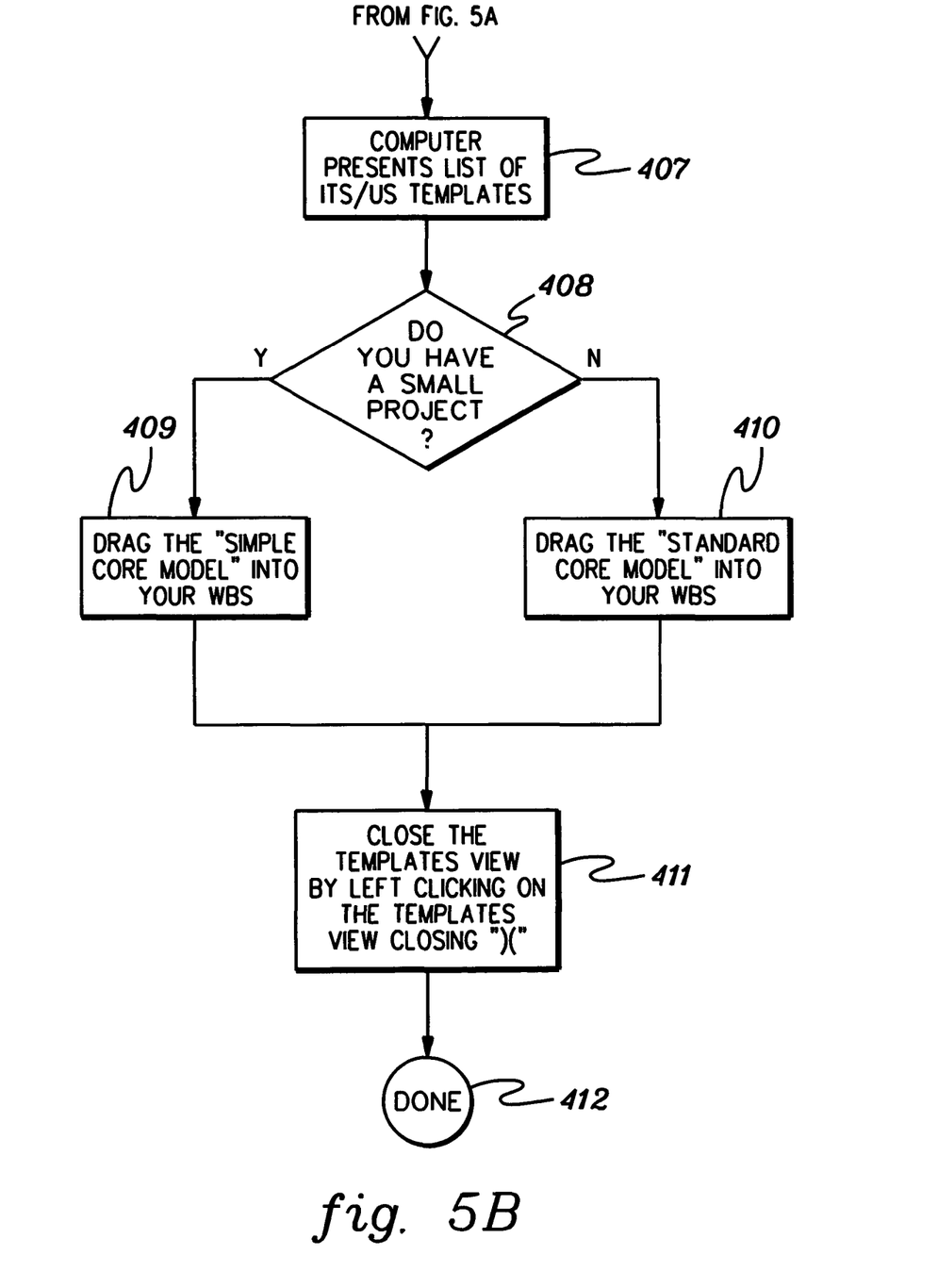

As another example of attaching links in a step-by-step process, without interrupting process flow to access external materials, is block 208 of FIG. 3. The instruction of block 208 is to "Pull the appropriate Core Model into your project." The steps needed to perform this process are attached directly to the process-based documentation method, as opposed to requiring the user to search a manual. In this particular example, the user is directed to access the PMOffice™ tool and execute the steps to pull in the Core Model. FIG. 5 shows the procedure (in steps 401-412) from PMOffice™ for pulling the Core Model template into a particular project, without requiring access to the PMOffice™ manuals. And for each step 401-412, further detail can be attached and accessed as needed during performance of the process. For example, under step 403 (left click on the "templates" icon), screen shots of the referenced information may be provided for use in completing this step.

Figure 6:
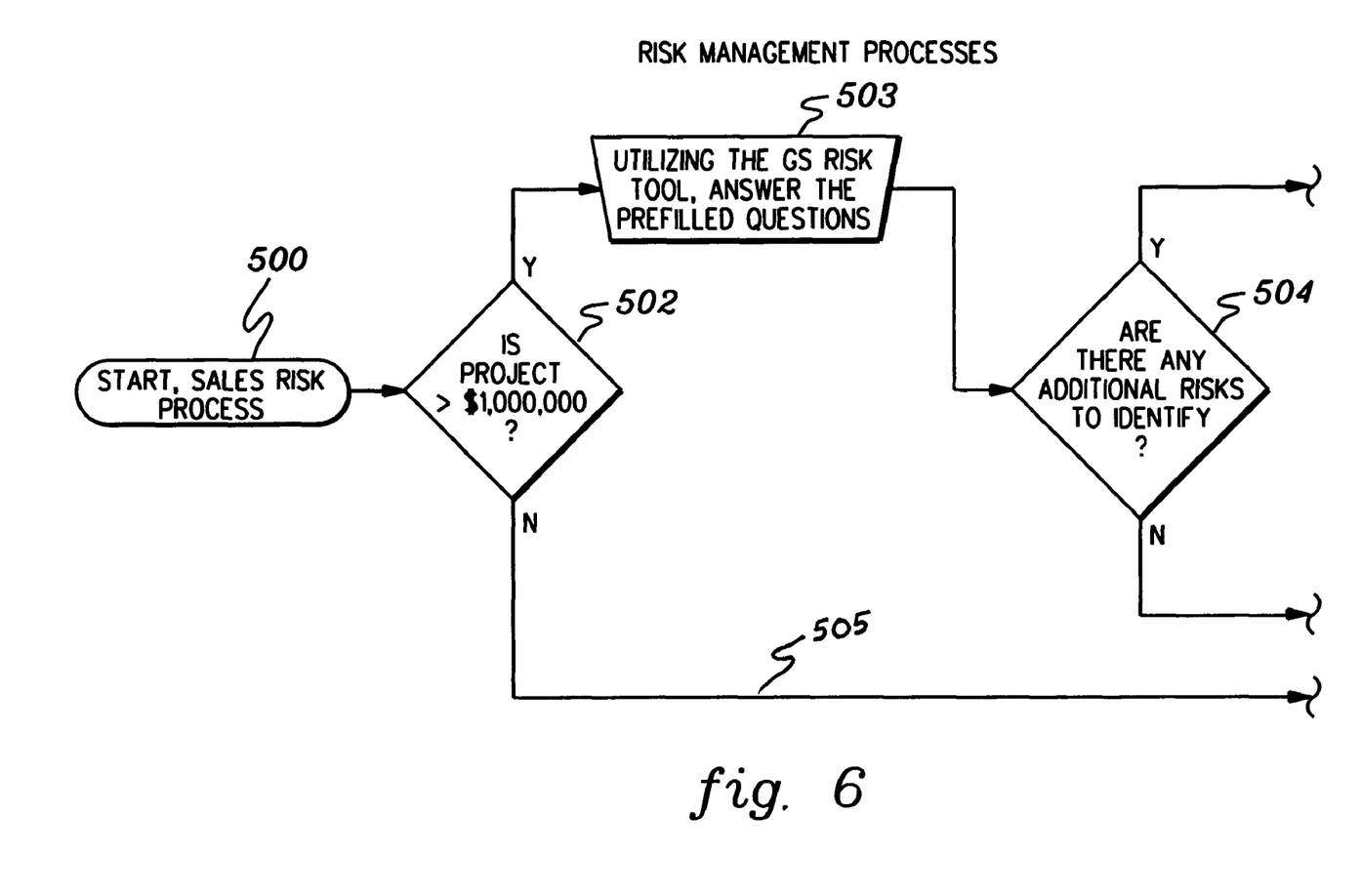
FIG. 6 illustrates an exemplary business rule to which principles of the present invention are applicable.

FIG. 6 illustrates another example of a business rule, for example, in a risk management process, which may be used and documented in accordance with an application of the present invention. The process begins at step 500 (Start, Sales Risk Process). Then, in step 502, the business rule is applied; that is, an inquiry is made to determined whether the project meets a financial threshold, e.g., $1M. If so, then the process continues to step 503 where reference is made to a risk analysis checklist; and to step 504 where the user is asked whether there are any additional risks. If the answer to the business rule inquiry of step 502 is no, then the process flows on a different path 505.

In accordance with aspects of the present invention, the process-based documentation method provides for process mapping and documentation by: creating detailed process flow charts for the process and associated sub processes; creating procedure flow charts that integrate a tool's function (e.g., PMOffice™) with the business objective; linking the system together, i.e., processes, sub processes, procedures; and attaching information to the steps in the flow diagrams (e.g., screen shots, web sites, forms, checklists, etc.).

Advantageously, the processes described hereinabove are thus mapped and documented in accordance with the present invention without requiring any outside training or accessing any information beyond what is provided step-by-step through the process. That is, in using the process-based documentation method and system of the present invention, a user merely follows the process flow, without training and without having to access additional manuals or other external information that is not referenced by or directly attached to the process steps for access as needed. Hence, the user is guided through any and all functions needed to complete a process step, while ignoring any functions that are not needed. Moreover, as desired, detail can be added to any process level without adversely affecting flow of the overall process.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A self-contained method for providing process-based documentation for a business process, the method comprising:
    diagramming, using a tool executed on a processor, flow charts for each high level process for achieving objectives of the business process in accordance with at least one business rule, including diagramming flow charts for a procedure, and corresponding procedure flow, for performing each step of each process, each procedure being directly accessed through the corresponding process step, the flow charts including a swim lane diagram for each process, such that each swim lane depicts a process goal and process steps for achieving each process goal, thereby providing process maps;
    diagramming flow charts for any sub processes of each high level process and any work products thereof, including diagramming flow charts for a procedure, and corresponding procedure flow, for performing each step of each sub process, each procedure being directly accessed through the corresponding process step, the flow charts including a swim lane diagram for each process, such that each swim lane depicts a process goal and process steps for achieving each process goal, thereby providing process maps;
    selecting from a plurality of types of repositories a type of repository to be used as a common repository for storing and retrieving documents related to the steps of each process and sub-process;
    linking information to corresponding steps of the processes for direct access thereto in a step-by-step manner without interrupting process flow to access external materials, wherein information beyond what is provided step-by-step is not accessed; and
    storing and retrieving documents related to the steps of each process and sub process, including the process maps and information, in the common repository, wherein the common repository integrates processes, sub-processes, procedures, reference materials and forms that provide the steps for successfully executing a process to deliver desired results without requiring access to other information external thereto.

2. The method of claim 1, wherein the information comprises at least one of a group consisting of a form, manual, documentation, instructions, and a web link.

3. The method of claim 1, wherein the direct access to information is provided by clicking action.

4. The method of claim 1, wherein the plurality of repositories comprise an external tool, a project control book and a stand-alone repository.

5. The method of claim 4, wherein the stand-alone repository does not require links to other external tools.

6. The method of claim 1, wherein the selecting, selects an external tool as the common repository, and wherein responsive to selecting the external tool as the common repository, the method further comprises:
    determining whether this is a user's first time using the external tool;
    responsive to the determining indicating this is the user's first time, confirming machine configuration and performing training;
    creating an external tool project; and
    pulling in an appropriate core model into the created external tool project.

7. The method of claim 1, wherein the selecting selects a stand-alone repository as the common repository, and wherein responsive to selecting the stand-alone repository as the common repository, the method further comprises:
    selecting a control book methodology;
    determining whether a project to be associated with the common repository is small;
    responsive to the determining indicating the project is small, obtaining a simple core model template, otherwise, obtaining a standard core model template; and
    storing the obtained core model template in the common repository.

8. A system for providing process-based documentation for a business process, the system comprising:
- a memory; and
- at least one processor in communications with the memory, wherein the system is configured to perform a method, said method comprising:
  - diagramming flow charts for each high level process for achieving objectives of the business process in accordance with at least one business rule, including diagramming flow charts for a procedure, and corresponding procedure flow, for performing each step of each process, each procedure being directly accessed through the corresponding process step, the flow charts including a swim lane diagram for each process, such that each swim lane depicts a process goal and process steps for achieving each process goal, thereby providing process maps;
  - diagramming flow charts for any sub processes of each high level process and any work products thereof, including diagramming flow charts for a procedure, and corresponding procedure flow, for performing each step of each sub process, each procedure being directly accessed through the corresponding process step, the flow charts including a swim lane diagram for each process, such that each swim lane depicts a process goal and process steps for achieving each process goal, thereby providing process maps;
  - selecting from a plurality of types of repositories a type of repository to be used as a common repository for storing and retrieving documents related to the steps of each process and sub-process;
  - linking information to corresponding steps of the processes for direct access thereto in a step-by-step manner without interrupting process flow to access external materials, wherein information beyond what is provided step-by-step is not accessed; and
  - storing and retrieving documents related to the steps of each process and sub process, including the process maps and information, in the common repository, wherein the common repository integrates processes, sub-processes, procedures, reference materials and forms that provide the steps for successfully executing a process to deliver desired results without requiring access to other information external thereto.

9. The system of claim 8, wherein the information comprises at least one of a group consisting of a form, manual, documentation, instructions, and a web link.

10. The system of claim 8, wherein the direct access to information is provided by clicking action.

11. The system of claim 8, wherein the plurality of repositories comprise an external tool, a project control book and a stand-alone repository.

12. The system of claim 11, wherein the stand-alone repository does not require links to other external tools.

13. The system of claim 8, wherein the selecting selects an external tool as the common repository, and wherein responsive to selecting the external tool as the common repository, the method further comprises:
- determining whether this is a user's first time using the external tool;
- responsive to the determining indicating this is the user's first time, confirming machine configuration and performing training;
- creating an external tool project; and
- pulling in an appropriate core model into the created external tool project.

14. The system of claim 8, wherein the selecting selects a stand-alone repository as the common repository, and wherein responsive to selecting the stand-alone repository as the common repository, the method further comprises:
- selecting a control book methodology;
- determining whether a project to be associated with the common repository is small;
- responsive to the determining indicating the project is small, obtaining a simple core model template, otherwise, obtaining a standard core model template; and
- storing the obtained core model template in the common repository.

15. A computer program product for providing process-based documentation, the computer program product comprising:
- a computer readable storage medium having computer readable program code embodied therewith, the computer readable program code comprising:
  - computer readable program code configured to diagram flow charts for each high level process for achieving objectives of the business process in accordance with at least one business rule, including diagramming flow charts for a procedure, and corresponding procedure flow, for performing each step of each process, each procedure being directly accessed through the corresponding process step, the flow charts including a swim lane diagram for each process, such that each swim lane depicts a process goal and process steps for achieving each process goal, thereby providing process maps;
  - computer readable program code configured to diagram flow charts for any sub processes of each high level process and any work products thereof, including diagramming flow charts for a procedure, and corresponding procedure flow, for performing each step of each sub process, each procedure being directly accessed through the corresponding process step, the flow charts including a swim lane diagram for each process, such that each swim lane depicts a process goal and process steps for achieving each process goal, thereby providing process maps;
  - computer readable program code configured to select from a plurality of types of repositories a type of repository to be used as a common repository for storing and retrieving documents related to the steps of each process and sub-process;
  - computer readable program code configured to link information to corresponding steps of the processes for direct access thereto in a step-by-step manner without interrupting process flow to access external materials, wherein information beyond what is provided step-by-step is not accessed; and
  - computer readable program code configured to store and retrieve documents related to the steps of each process and sub process, including the process maps and information, in the common repository, wherein the common repository integrates processes, sub-processes, procedures, reference materials and forms that provide the steps for successfully executing a process to deliver desired results without requiring access to other information external thereto.

16. The computer program product of claim 15, wherein the information comprises at least one of a group consisting of a form, manual, documentation, instructions, and a web link.

17. The computer program product of claim 15, wherein the plurality of repositories comprise an external tool, a project control book and a stand-alone repository.

18. The computer program product of claim 17, wherein the stand-alone repository does not require links to other external tools.

19. The computer program product of claim 15, wherein the selecting selects an external tool as the common repository, and wherein responsive to selecting the external tool as the common repository, the method further comprises:
   determining whether this is a user's first time using the external tool;
   responsive to the determining indicating this is the user's first time, confirming machine configuration and performing training;
   creating an external tool project; and
   pulling in an appropriate core model into the created external tool project.

20. The computer program product of claim 15, wherein the selecting selects a stand-alone repository as the common repository, and wherein responsive to selecting the stand-alone repository as the common repository, the method further comprises:
   selecting a control book methodology;
   determining whether a project to be associated with the common repository is small;
   responsive to the determining indicating the project is small, obtaining a simple core model template, otherwise, obtaining a standard core model template; and
   storing the obtained core model template in the common repository.

* * * * *